(12) United States Patent
Hidle

(10) Patent No.: US 8,775,790 B2
(45) Date of Patent: Jul. 8, 2014

(54) SYSTEM AND METHOD FOR PROVIDING SECURE NETWORK COMMUNICATIONS

(75) Inventor: Frederick Hidle, Landsdale, PA (US)

(73) Assignee: Honeywell International Inc., Morristown, NJ (US)

( * ) Notice: Subject to any disclaimer, the term of this patent is extended or adjusted under 35 U.S.C. 154(b) by 1730 days.

(21) Appl. No.: 11/981,213

(22) Filed: Oct. 30, 2007

(65) Prior Publication Data

US 2009/0113202 A1 Apr. 30, 2009

(51) Int. Cl.
*H04L 29/06* (2006.01)
(52) U.S. Cl.
USPC .......................... 713/151; 713/153
(58) Field of Classification Search
None
See application file for complete search history.

(56) References Cited

U.S. PATENT DOCUMENTS

| | | | |
|---|---|---|---|
| 5,319,712 A * | 6/1994 | Finkelstein et al. | 380/44 |
| 6,418,423 B1 * | 7/2002 | Kambhatla et al. | 706/15 |
| 7,162,738 B2 | 1/2007 | Dickinson et al. | |
| 7,392,378 B1 * | 6/2008 | Elliott | 713/153 |
| 7,441,267 B1 * | 10/2008 | Elliott | 726/13 |
| 7,620,811 B2 * | 11/2009 | Maeda et al. | 713/165 |
| 2005/0071628 A1 * | 3/2005 | Yang et al. | 713/151 |
| 2005/0071629 A1 * | 3/2005 | Biederman et al. | 713/151 |
| 2005/0138582 A1 * | 6/2005 | So et al. | 716/4 |
| 2006/0031664 A1 * | 2/2006 | Wilson et al. | 713/1 |
| 2006/0052085 A1 | 3/2006 | Rodriguuez et al. | |

FOREIGN PATENT DOCUMENTS

| | | |
|---|---|---|
| JP | 2001-237824 A | 8/2001 |
| JP | 2003-318880 A | 11/2003 |

OTHER PUBLICATIONS

National Computer Security Center Product Evaluation Report for Verdix Secure Local Area Network, Jul. 25, 1990.*
Daniel Oxenhandler, "Designing a Secure Local Area Network"; SANS Institute InfoSec Reading Room, 2003.*
Machine translation of JP20011237824, which was published on Aug 31, 2001. JP patent document was filed by Applicant on May 18, 2009.*
Lee, Burton H. "Embedded Internet Systems: Poised for Takeoff" IEEE Internet Computing, May Jun. 1998, pp. 24-29.*
"IP/MPLS-Based VPNS, Layer-3 vs. Layer-2", Foundry Networks, 2002, 16 pages.

* cited by examiner

*Primary Examiner* — Kaveh Abrishamkar

(57) ABSTRACT

A method includes receiving a data message, from a first embedded node, in a first end point device. The first data message is addressed to a second embedded node. The method also includes encrypting the first data message to produce an encrypted data message, where the encryption is transparent to the first embedded node. The method further includes transmitting the encrypted data message to a second end point device. An apparatus includes a plurality of embedded node ports each configured to communicate with an embedded node. The apparatus also includes an encrypted communications link port configured to communicate with an end point device. The apparatus further includes a controller connected to communicate with the embedded node ports and the encrypted communications link port. In addition, the apparatus includes a storage connected to be read from and written to by the controller.

21 Claims, 4 Drawing Sheets

SYSTEM AND METHOD FOR PROVIDING SECURE NETWORK COMMUNICATIONS

TECHNICAL FIELD

This disclosure relates generally to networked computing systems and more specifically to a system and method for providing secure network communications.

BACKGROUND

Often it is necessary to have encrypted traffic on a network for security. However, in massive embedded deployments, the processing overhead involved in implementing typical network security, such as IPSec or other encrypted network engines, combined with limited processing resources makes it impractical to implement in an embedded device.

SUMMARY

This disclosure provides a system and method for providing secure network communications.

In a first embodiment, a method includes receiving a data message, from a first embedded node, in a first end point device. The first data message is addressed to a second embedded node. The method also includes encrypting the first data message using a Layer 2 encryption process to produce an encrypted data message. The encryption is transparent to the first embedded node. The method further includes transmitting the encrypted data message to a second end point device. Some embodiments also include receiving the encrypted data message in the second end point device, decrypting the encrypted data message to produce a second data message corresponding to the first data message, and transmitting the second data message to the second embedded node.

In a second embodiment, an apparatus includes a plurality of embedded node ports each configured to communicate with an embedded node. The apparatus also includes an encrypted communications link port configured to communicate with an end point device. The apparatus further includes a controller connected to communicate with the embedded node ports and the encrypted communications link port, where the controller is associated with an encryption controller configured to encrypt packets forming data messages with a Layer 2 encryption process. In addition, the apparatus includes a storage connected to be read from and written to by the controller. Some embodiments also include a memory associated with the encryption controller, where the memory stores an encryption key pair and information identifying at least one other end point device.

In a third embodiment, a communications network includes a plurality of embedded nodes and a first end point device. The first end point device has plurality of embedded node ports each configured to communicate with an embedded node. The first end point device also includes an encrypted communications link port configured to communicate with a second end point device on a second physical network, to thereby form a single logical network with the first end point device. The first end point device further includes a controller connected to communicate with the embedded node ports and the encrypted communications link port, and configured to perform Layer-2 encryption. In addition, the first end point device includes a storage connected to be read from and written to by the controller. Some embodiments also include a second plurality of embedded nodes. The second end point device has a plurality of embedded node ports each configured to communicate with a respective one of the second plurality of embedded nodes, an encrypted communications link port configured to communicate with the first end point device, a controller connected to communicate with the embedded node ports and the encrypted communications link port, and a storage connected to be read to and written by the controller.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
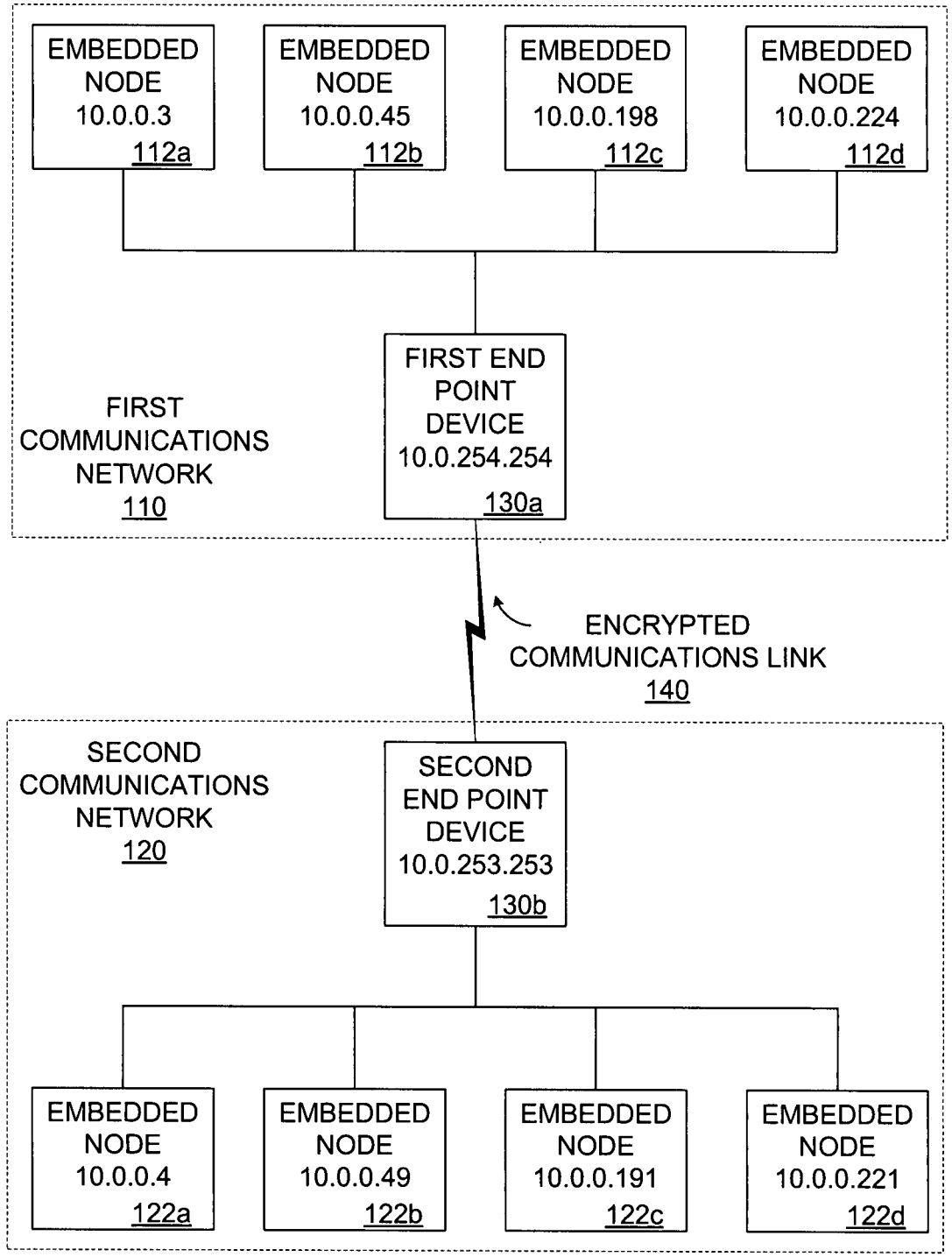
FIG. 1 is a block diagram of an example communications network 100 according to one embodiment of this disclosure.

FIG. 1 is a block diagram of an example communications network 100 according to one embodiment of this disclosure. The embodiment of the communications network 100 shown in FIG. 1 is for illustration only. Other embodiments of the communications network 100 may be used without departing from the scope of this disclosure.

As illustrated in FIG. 1, various disclosed embodiments include network end point devices, shown as first end point device 130a and second end point device 130b, that can encrypt all network traffic between two separate networks. In this figure, first communications network 110 communicates with second communications network 120 over an encrypted communications link 140 managed by end point devices 130a and 130b. This allows secure communication between the two networks by an encrypted communication over either a direct connection or a connection via a vulnerable public or private network.

In this figure, first end point device 130a is connected to communicate with embedded nodes 112a-112d via any known communications means, such as an Ethernet network, serial communications, hardwired or wireless communications, etc. Together, first end point device 130a and embedded nodes 112a-112s form first communications network 110. Note that while four embedded nodes are shown in this example, more or less nodes can be used according to the desired implementation.

Similarly, in this figure, second end point device 130b is connected to communicate with embedded nodes 122a-122d via any known communications means, such as an Ethernet network, serial communications, hardwired or wireless communications, etc. Together, second end point device 130b and embedded nodes 122a-122s form second communications network 120. Note that while four embedded nodes are shown in this example, more or less nodes can be used according to the desired implementation.

According to various embodiments, each end point device 130a/130b has multiple ports to which embedded nodes 112a-d and 122a-d are respectively attached. Each embedded node can be associated with a respective embedded device, known to those of skill in the art. The embedded nodes communicate with nodes connected to the other end point, and vice versa. For example, one or more of embedded nodes 112a-d can communicate with one or more of embedded nodes 122a-d.

The end points relay traffic over encrypted communications link 140, which can be encrypted using any known technique, including Internet Protocol Security (IPSec), wireless encryption protocol (WEP), Advanced Encryption Standard (AES), and others. The encrypted communications link 140 can be used to transmit data traffic including broadcast, multicast, proprietary personal or commercial data, and other forms of traffic between the two networks without modifying the IP-layer network information. All traffic between the two end points can be encrypted.

The end point devices 130a/130b can perform all network processing to encrypt and decrypt the packets. The networks 110/120 on either side of encrypted communications link 140 can be in the same subnet or in different subnets. The nodes 112a-112d and 122a-122d on either side of the encrypted segment can communicate with each other without having any awareness that the encrypted link exists. The disclosed end point devices therefore enable the joining of two distinct physical networks on the same logical network, in a manner transparent to the embedded nodes.

End point devices 130a/130b can also act as firewalls and rate limiters pursuant to the needs of the implementation, in various disclosed embodiments. Moreover, MAC-layer or other security measures can be employed, including monitoring for unauthorized media access control (MAC) addresses, disabling ports to which unauthorized nodes are attached, and other methods involving securing the network.

Figure 2:
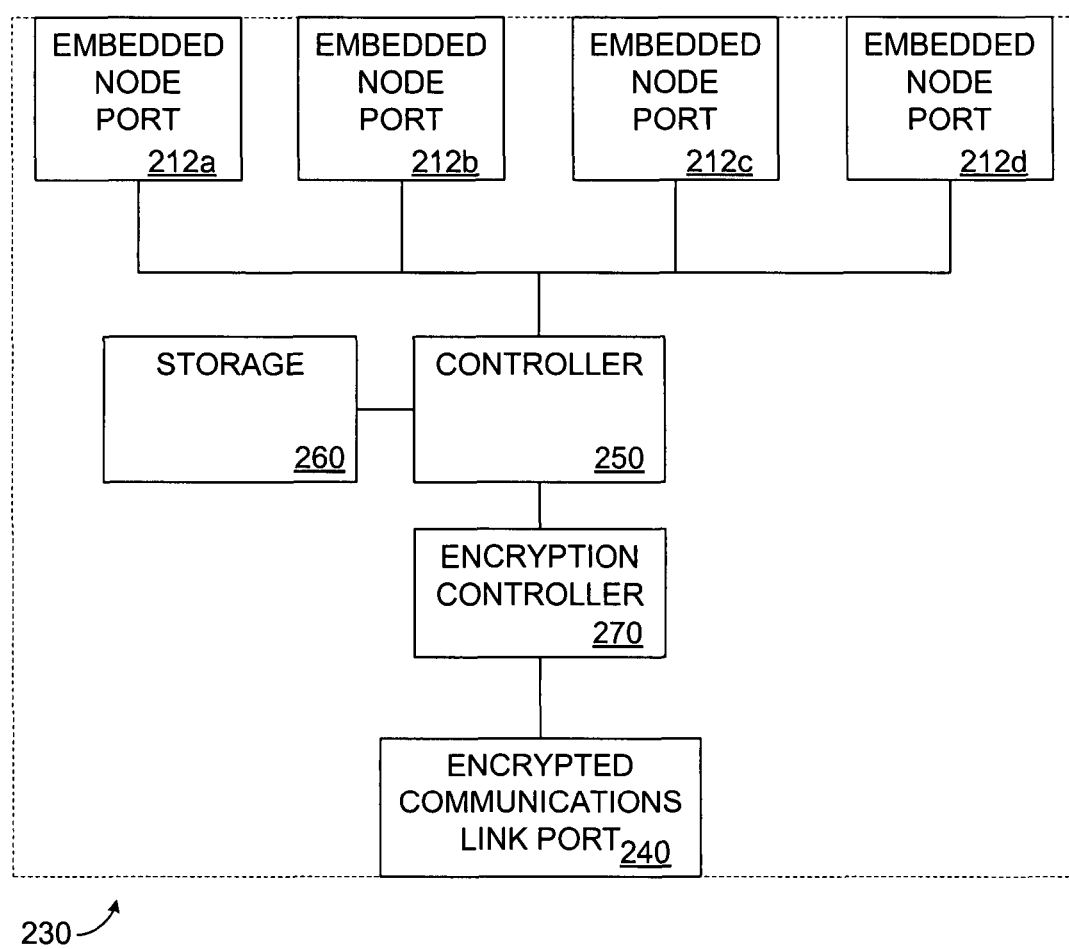
FIG. 2 is a block diagram of an end point according to one embodiment of this disclosure.

FIG. 2 is a block diagram of an end point device 230 that can be used as end point devices 130a/130b according to one embodiment of this disclosure. The embodiment of the end point device 230 shown in FIG. 2 is for illustration only. Other embodiments of the end point device 230 may be used without departing from the scope of this disclosure.

According to one disclosed embodiment, end point device 230 is implemented as an embedded computer system. End point device 230 includes a plurality of embedded node ports 212a-212d, configured to be connected to and communicate with embedded nodes such as embedded nodes 112a-112d. Again, although four embedded node ports are shown in this example, the number of ports can be increased or decreased depending on the required implementation. Embedded node ports 212a-212d can be implemented using any known communications port, including in particular a conventional Ethernet port.

End point device 230 also includes an encrypted communications link port 240 that is configured to be connected to and communicate over encrypted communications link 140. Note that in other implementations, encrypted communications link port can include an RF transceiver and related hardware and software to implement a wireless communication link as known to those of skill in the art. Encrypted communications link port 240 can be implemented using any known communications port, including in particular a conventional Ethernet port.

End point device 230 further includes a controller 250 configured and connected to communicate with embedded node ports 212a-d and encrypted communications link port 240. Controller 250, which can be implemented, for example, as a microprocessor or microcontroller, also communicates with storage 260, which can be implemented as any computer-usable medium.

Controller 250 can be configured to execute an operating system, networking drivers, encryption drivers, and filtering software that acts upon the relayed traffic. The software, stored in storage 260, can be configured to attach two independent network interfaces, such as embedded node ports 212a-212d and encrypted communications link port 240, and relay all traffic incoming on one interface to the output of the other, and vice versa. An encryption controller 270, associated with controller 250, can be configured to encrypt all traffic outgoing and decrypt all traffic incoming, regardless of source or destination MAC or IP address, to be transmitted over encrypted communications link port 240. End point device 230 can also be configured to transparently perform rate-limiting and filtering/rejection of undesired traffic. In various embodiments, encryption controller is implemented as an FPGA.

In various embodiments, controller 250 only acts to wrap the passing traffic in a header and to perform Firewalling or other activities on incoming/outgoing traffic after decryption (inbound) or before encryption (outbound), and to perform other general routing and control functions for end point device 230. In some embodiments, it also acts as an FTE controller should this device be made to support a proprietary network such as the FAULT TOLERANT ETHERNET (FTE) network from HONEYWELL INTERNATIONAL INC. In some embodiments, controller 250 is independent of, and "unaware" of, the encryption controller 270, so that encryption controller 270 performs its functions without any control by or interaction with controller 250, other than passing the data packets.

When an encrypted packet arrives, the Ethernet physical layer (PHY) converts the received analog signal to a digital packet on an media independent interface (MII) bus, and that packet is received by Encryption Controller 270, which decrypts the packet (which was encrypted using the Layer 2 scheme). It then passes the unencrypted packet to the controller 250, which unwraps the payload, performs filtering on the resulting packet (whether it be UDP, TCP, IP, FTE, Multicast, or otherwise), and passes it to the embedded node.

Similarly, when an unencrypted packet arrives from an embedded node, the controller 250 receives it, performs any filtering or rate limiting, then wraps it in a header, as described in more detail below. The controller then passes it to the encryption controller 270, which encrypts the entire wrapped packet (MAC addresses and all), packages it into a Layer 2 frame, and sends it out to the Ethernet PHY, which converts it to the analog signal for the wire.

Figure 3:
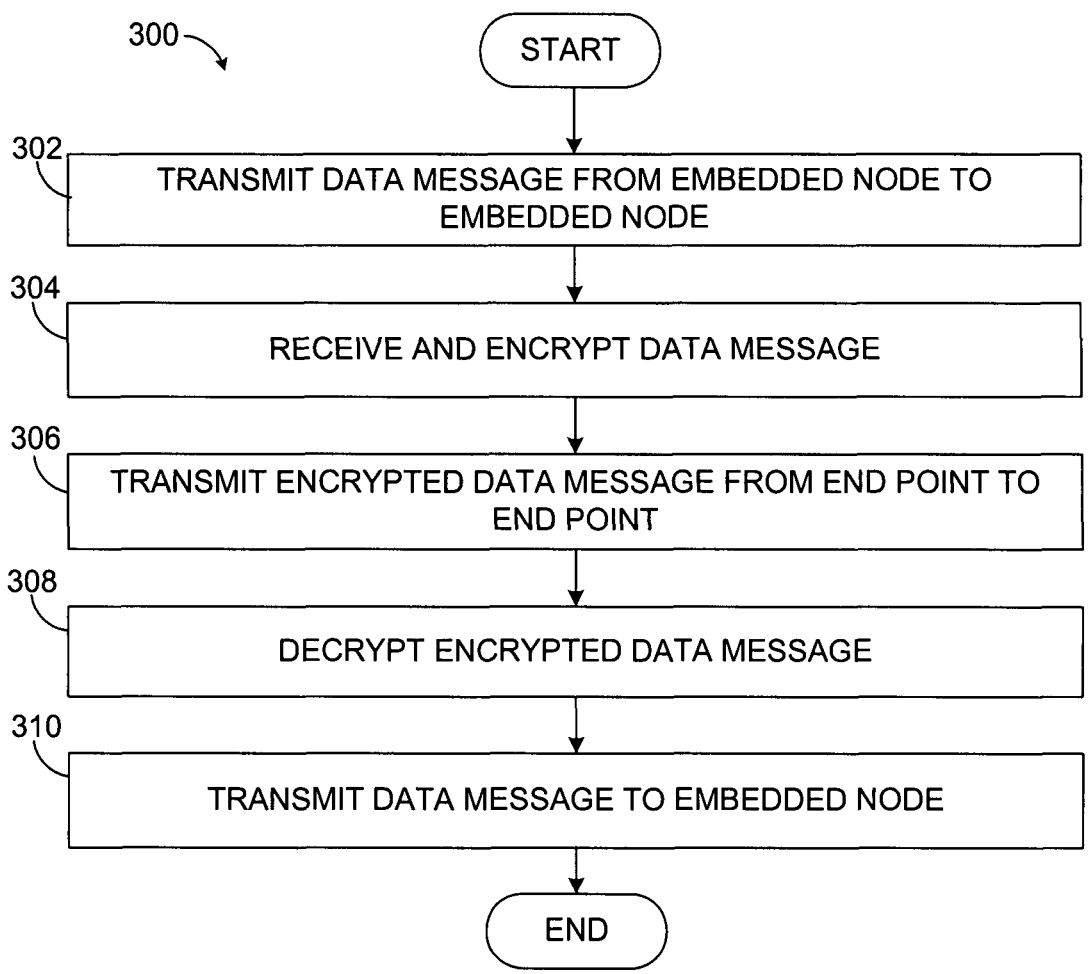
FIG. 3 illustrates an example method for providing secure network communications according to one embodiment of this disclosure.

FIG. 3 illustrates an example method 300 for providing secure network communications according to one embodiment of this disclosure. The embodiment of the method 300 shown in FIG. 3 is for illustration only. Other embodiments of the method 300 may be used without departing from the scope of this disclosure.

At step 302, an embedded node 112a transmits a first data message for embedded node 122a. The first data message can, for example, be formatted as a conventional internet protocol (IP) message and is addressed to embedded node 122a.

At step 304, first end point device 130a receives the first data message and encrypts the data message to produce an encrypted data message.

At step 306, first end point device 130a transmits the encrypted data message across encrypted communications link 140 to second end point device 130b.

At step 308, second end point device 130b receives the encrypted data message and decrypts it to produce a second data message corresponding to the first data message.

At step 310, second end point device 130b transmits the second data message to embedded node 122a. The encryption and transmission between the first and second end point devices have been transparent to embedded nodes 112a and 122a.

Reply messages and other messages between the embedded nodes can be accomplished using the same or similar process as described above. In some embodiments, a single embedded node can "multicast" or broadcast a message to multiple recipient embedded nodes.

Figure 4:
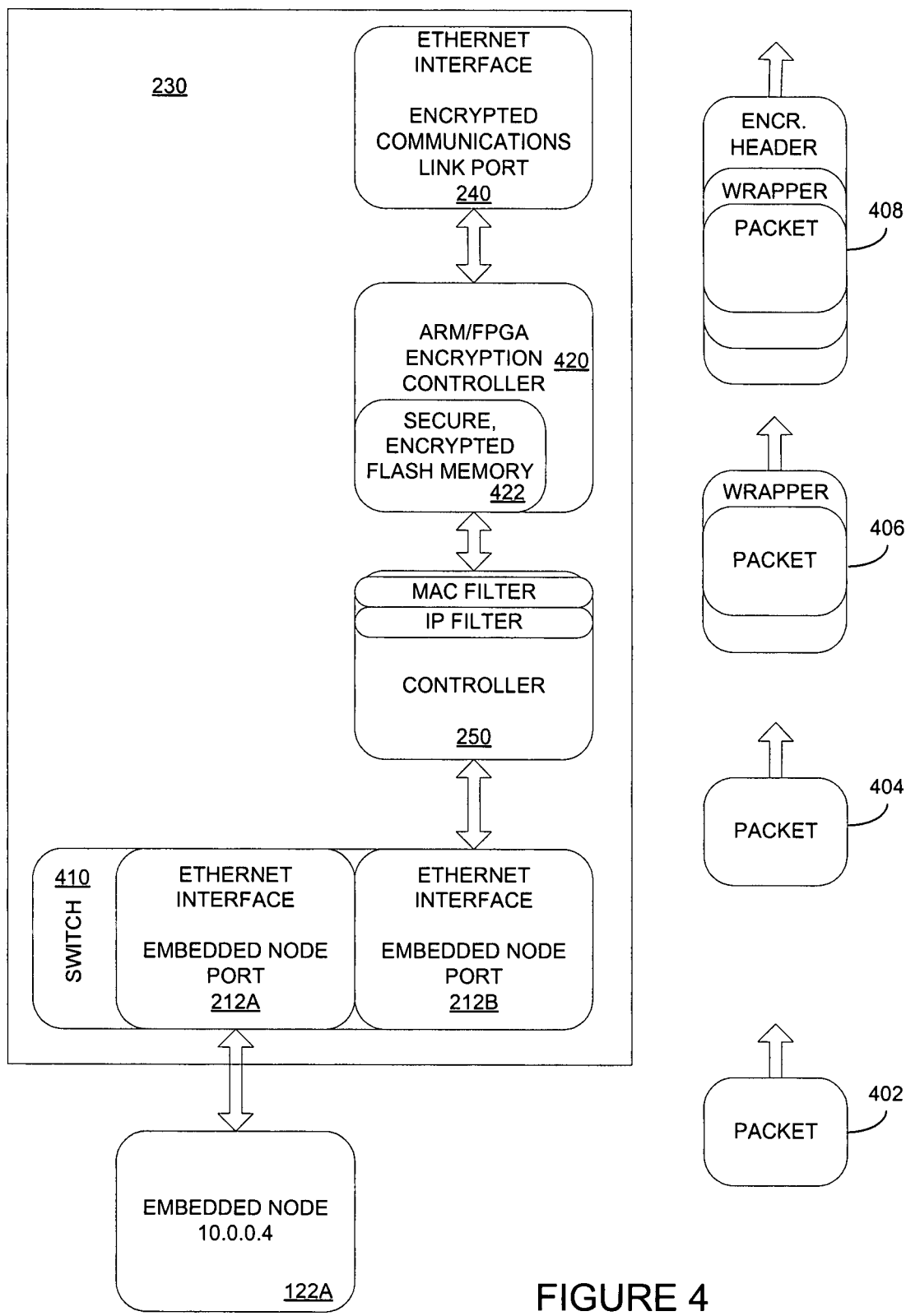
FIG. 4 is a more detailed block diagram of an end point device according to one embodiment of this disclosure.

FIG. 4 is a more detailed block diagram of an end point device 230 according to one embodiment of this disclosure. FIG. 4 also includes an illustration of packet events that occur during processing.

End point device 230 includes embedded node ports 212a and 212b (and others) that can be implemented, for example, as Ethernet interfaces. These embedded node ports can be connected to communicate with each other via switch 410. Each embedded node port can communicate with a respective embedded node, such as embedded node 122a. These communications could be packet-based and can include an unencrypted packet data, shown as packet 402.

The embedded node ports 212a/b and/or switch 410 communicate with controller 250, for example over a media independent interface (MII) bus, known to those of skill in the art. These communications could also be packet-based and can include an unencrypted packet data, shown as packet 404.

Controller 250 can include a MAC filter and IP filter, which can be used to filter traffic not from other authorized end points. The controller 250 can implement other known commercial, public, or proprietary functions.

In some embodiments, the processor 250 also wraps the packet 404 in a wrapper, using any known public or private wrapping technique, and includes the original packet 404 as its payload. The wrapped packet is communicated to the encryption controller 420, shown as packet 406, in some embodiments over an MII bus.

The encryption controller 420 can be implemented as a microprocessor, microcontroller, or otherwise, including as field-programmable gate array (FPGA). Also, the functions of encryption controller 420 can be implemented by controller 250.

In some embodiments, encryption controller 420 is associated with a secure, encrypted flash memory 422. Flash memory 422 can contain an encryption key pair and MAC address for each authorized end point device. In particular embodiments, the flash memory 422 is programmed by the manufacturer and is not accessible by the end user.

In various embodiments, the encryption controller 420 encrypts the entire packet 406 and appends a Layer-2 header with its own MAC address, shown as packet 408. In various embodiments, packet 408 has a payload that is encrypted data including packet 406 and all headers above Layer 2. Encryption controller 420 then communicates packet 408 to encrypted communications link port 240, which can be implemented as an Ethernet interface. The communications can be over an MII bus.

In some embodiments, the encryption is done at Layer 2 by a commercial, publicly available, or proprietary code in an FPGA and not by a high-level operating system, which may have known vulnerabilities. Performing the encryption at Layer 2 gives the advantage that there is no unencrypted data except the source and destination MAC addresses of the two end points, thereby securing even the MAC addresses of the embedded nodes, even when the traffic is MAC broadcast.

When two end point devices are communicating, in some embodiments, they exchange a sequence of handshake packets to establish authenticity using codes based on a rotating time table. In various embodiments, the two end point devices verify encryption keys by exchanging and testing (decrypting and verifying) an encrypted message, thereby performing a challenge/response exchange.

In various embodiments, the encryption and decryption is transparent to the second embedded node. In various embodiments, the decryption is transparent to the first embedded node. In various embodiments, the second data message is identical to the first data message.

In various embodiments, the encryption controller is configured to receive a first data message from an embedded node port, encrypt the first data message to produce an encrypted data message, and transmit the encrypted data message to the encrypted communications link port. In various embodiments, the controller is configured to receive an encrypted data message from the encrypted communications link port, decrypt the encrypted data message to produce a decrypted data message, and transmit the decrypted date message to at least one of the embedded node ports. In various embodiments, the controller is configured perform an encryption process that is transparent to devices connected to the embedded node ports. In various embodiments, the controller is configured to transparently perform rate-limiting functions. In various embodiments, the controller is configured to transparently perform filtering of undesired traffic using at least one of IP filtering or media access control (MAC) filtering. In some embodiments, the controller is configured to execute an operating system, networking drivers, encryption drivers, and filtering software.

The term "Layer 2" refers to the Data Link Layer of the protocol stack, as known to those of skill in the art and defined by the Open System Interconnection (OSI) model for data communications, hereby incorporated by reference. Layer 2 establishes the physical connection between the local telecommunications device and the remote destination and defines the Data Frame as the physical transmission medium between nodes.

Layer 2 is primarily used for high-speed/high-data throughput point-to-point applications between telecommunication devices or facilities. In order to achieve these high-speeds, hardware encryption is predominantly used. Encryption at this level encapsulates any Layer 2 protocol crossing the link, unlike Layer 3 where only IP packets are encrypted. For this reason, Layer 2 encryption is much more flexible for point-to-point applications where routing is not a consideration. Layer 2 encryption also provides platform independence because client systems will not require special software or hardware to manage routing decisions.

Virtual Private Network (VPN) is the term commonly used to describe the capability to segregate private traffic on a publicly shared network infrastructure and is typically a Level 3 solution. The majority of the VPN market is focused on tunneling and encryption at Layer 3 and thus is subject to the configuration overheads associated with routing decisions and the vulnerabilities discussed above.

In some embodiments, various functions described above are implemented or supported by a computer program that is formed from computer readable program code and that is embodied in a computer useable medium. The phrase "computer readable program code" includes any type of computer code, including source code, object code, and executable code. The phrase "computer useable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The term "application" refers to one or more computer programs, sets of instructions, procedures, functions, objects, classes, instances, or related data adapted for implementation in a suitable computer language. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller can be implemented in hardware, firmware, software, or some combination of at least two of the same. The functionality associated with any particular controller can be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving a first data message, from a first embedded node, at an embedded node port of a first end point device, the first data message being addressed to a second embedded node, the embedded node port configured to communicate with the first embedded node;
encrypting the first data message using a Layer 2 encryption process to produce an encrypted data message, the encryption being transparent to the first embedded node, the encryption process performed by an encryption controller having a secure encrypted memory not accessible to an end user;
communicating the encrypted data message from the encryption controller to an encrypted communications link port over a media independent interface (MII) bus; and
transmitting the encrypted data message from the encrypted communications link port to a second end point device.

2. The method of claim 1, further comprising:
receiving the encrypted data message at the second end point device;
decrypting the encrypted data message to produce a second data message corresponding to the first data message; and
transmitting the second data message to the second embedded node.

3. The method of claim 2, wherein the encryption and decryption are transparent to the second embedded node.

4. The method of claim 2, wherein the decryption is transparent to the first embedded node.

5. The method of claim 1, wherein the second data message is identical to the first data message.

6. An apparatus comprising:
a plurality of embedded node ports, each of the embedded node ports configured to communicate with an embedded node;
an encrypted communications link port configured to communicate with an end point device;
a controller configured to communicate with the embedded node ports and the encrypted communications link port, the controller associated with an encryption controller having a secure encrypted memory not accessible to an end user, the encryption controller configured to encrypt packets forming data messages with a Layer 2 encryption process, the encryption controller further configured to communicate the encrypted packets to the encrypted communications link port over a media independent interface (MII) bus; and
a storage configured to be read from and written to by the controller.

7. The apparatus of claim 6, wherein the encryption controller is configured to receive a first data message from one of the embedded node ports, encrypt the first data message to produce an encrypted data message, and transmit the encrypted data message to the encrypted communications link port.

8. The apparatus of claim 6, wherein the encryption controller is configured to receive an encrypted data message from the encrypted communications link port, decrypt the encrypted data message to produce a decrypted data message, and transmit the decrypted date message to at least one of the embedded node ports.

9. The apparatus of claim 6, wherein the secure encrypted memory is configured to store an encryption key pair and information identifying at least one other end point device.

10. The apparatus of claim 6, wherein the encryption controller is configured to perform the encryption process in a manner that is transparent to devices connected to the embedded node ports.

11. The apparatus of claim 6, wherein the controller is configured to transparently perform rate-limiting functions.

12. The apparatus of claim 6, wherein the controller is configured to transparently perform filtering of undesired traffic using at least one of: Internet Protocol (IP) filtering and media access control (MAC) filtering.

13. A communications network comprising
a plurality of embedded nodes; and
a first end point device on a first physical network, the first end point device having:
a plurality of embedded node ports, each of the embedded node ports configured to communicate with a respective one of the embedded nodes;
an encrypted communications link port configured to communicate with a second end point device on a second physical network to thereby form a single logical network with the first end point device;
a controller configured to communicate with the embedded node ports and the encrypted communications link port, the controller associated with an encryption controller having a secure encrypted memory not accessible to an end user, the encryption controller configured to encrypt packets forming data messages with a Layer 2 encryption process, the encryption controller further configured to communicate the encrypted packets to the encrypted communications link port over a media independent interface (MII) bus; and
a storage configured to be read from and written to by the controller.

14. The communications network of claim 13, wherein the controller is configured to receive a first data message from one of the embedded node ports, encrypt the first data message to produce an encrypted data message, and transmit the encrypted data message to the encrypted communications link port.

15. The communications network of claim 13, wherein the controller is configured to receive an encrypted data message from the encrypted communications link port, decrypt the encrypted data message to produce a decrypted data message, and transmit the decrypted date message to at least one of the embedded node ports.

16. The communications network of claim 13, wherein the controller is configured to execute an operating system, networking drivers, encryption drivers, and filtering software.

17. The communications network of claim 13, wherein the controller is configured to perform the encryption in a manner that is transparent to devices connected to the embedded node ports.

18. The communications network of claim 13, wherein the controller is configured to transparently perform rate-limiting functions.

19. The communications network of claim 13, wherein the controller is configured to transparently perform filtering of undesired traffic.

20. The communications network of claim 13, further comprising:
    a plurality of second embedded nodes, wherein the second end point device has:
        a plurality of second embedded node ports, each of the second embedded node ports configured to communicate with a respective one of the second embedded nodes;
        a second encrypted communications link port configured to communicate with the first end point device;
        a second controller configured to communicate with the second embedded node ports and the second encrypted communications link port; and
        a second storage configured to be read from and written to by the second controller.

21. The apparatus of claim 6, wherein the controller is configured to wrap each packet in a wrapper before communicating the wrapped packets to the encryption controller.

* * * * *